United States Patent
Fuh et al.

(10) Patent No.: US 10,800,151 B2
(45) Date of Patent: Oct. 13, 2020

(54) METHOD FOR MAKING FUNCTIONALLY GRADIENT COATINGS BY 3D PRINTING BASED ON ELECTROSTATIC SPINNING AND ELECTROSTATIC SPRAYING

(71) Applicants: National University of Singapore Suzhou Research Institute, Jiangsu (CN); National University of Singapore, Singapore (SG)

(72) Inventors: Jerry Ying Hsi Fuh, Singapore (SG); Jie Sun, Singapore (SG); Yang Wu, Singapore (SG); Hui Wang, Jiangsu (CN); Xi Chen, Jiangsu (CN)

(73) Assignee: National University of Singapore, Singapore (SG)

( * ) Notice: Subject to any disclaimer, the term of this patent is extended or adjusted under 35 U.S.C. 154(b) by 455 days.

(21) Appl. No.: 14/861,670

(22) Filed: Sep. 22, 2015

(65) Prior Publication Data
US 2016/0089837 A1     Mar. 31, 2016

(30) Foreign Application Priority Data
Sep. 29, 2014 (CN) .......................... 2014 1 0514752

(51) Int. Cl.
*B29C 64/106*     (2017.01)
*B33Y 10/00*     (2015.01)
(Continued)

(52) U.S. Cl.
CPC ............ *B33Y 10/00* (2014.12); *B29C 64/106* (2017.08); *D01D 5/0061* (2013.01); *B05B 5/005* (2013.01);
(Continued)

(58) Field of Classification Search
CPC ... B29C 67/0055; B29C 64/106; B33Y 10/00; D01D 5/0061; B05B 5/0255;
(Continued)

(56) References Cited

U.S. PATENT DOCUMENTS

2002/0090725 A1*   7/2002   Simpson ................. A61L 15/32
                                                        435/402
2004/0058887 A1*   3/2004   Bowlin ..................... A61F 2/08
                                                        514/44 R

FOREIGN PATENT DOCUMENTS

KR          20130106673 A   *   9/2013

OTHER PUBLICATIONS

Bock, Electrospraying of polymers with therapeutic molecules: State of the Art, Nov. 2012, Progress in Polymer Science, vol. 37 Issue 11, p. 1546 (Year: 2012).*

(Continued)

*Primary Examiner* — Matthew J Daniels
*Assistant Examiner* — Andrew L Swanson
(74) *Attorney, Agent, or Firm* — Cesari and McKenna, LLP

(57) ABSTRACT

A method for making functionally gradient coatings by 3D printing based on electrostatic spinning and electrostatic spraying is disclosed, which uses a hybrid 3D printing system based on electrostatic spinning and electrostatic spraying including: a first injection pump, a second injection pump, a first nozzle, a second nozzle, a high voltage power supply, a core rod collector, a controller, a motor and a speed-adjusting unit. The first injection pump, the first nozzle, the high voltage power supply, the core rod collector and the controller constitute an electrostatic spinning subsystem. The second injection pump, the second nozzle, the high voltage power supply, the core rod collector and the controller constitute an electrostatic spraying subsystem.

(Continued)

The electrostatic spinning subsystem is controlled by the controller to generate a first material coating, and the electrostatic spraying subsystem is controlled by the controller to generate a second material coating. The method can make multiple layers of functional gradient coatings according to individual needs.

11 Claims, 4 Drawing Sheets

(51) Int. Cl.
    *D01D 5/00*      (2006.01)
    *B29K 67/00*      (2006.01)
    *B05B 5/025*      (2006.01)
    *B05B 5/08*      (2006.01)
    *B05B 5/16*      (2006.01)
    *B05B 5/00*      (2006.01)

(52) U.S. Cl.
    CPC ............. *B05B 5/006* (2013.01); *B05B 5/0255* (2013.01); *B05B 5/087* (2013.01); *B05B 5/1675* (2013.01); *B29K 2067/04* (2013.01)

(58) Field of Classification Search
    CPC ....... B05B 5/087; B05B 5/1675; B05B 5/005; B05B 5/006; B29K 2067/04
    See application file for complete search history.

(56) References Cited

OTHER PUBLICATIONS

Office Action issued in Chinese Application No. 201410514752.X dated Sep. 5, 2018.
Second Office Action issued in Chinese Application No. 201410514752.X dated May 7, 2019.

\* cited by examiner

METHOD FOR MAKING FUNCTIONALLY GRADIENT COATINGS BY 3D PRINTING BASED ON ELECTROSTATIC SPINNING AND ELECTROSTATIC SPRAYING

CROSS-REFERENCE TO RELATED APPLICATIONS

The present application claims priority to Chinese Application No. 201410514752.X, filed on Sep. 29, 2014, the content of which are hereby incorporated by reference in its entirety.

BACKGROUND

Field

The present invention relates to tissue engineering technology and, more specifically, to a method for making functionally gradient coatings by 3D printing based on electrostatic spinning and electrostatic spraying.

Background Information

Traditional 3D printers are developed based on the working principle of an inkjet printer, which use a nozzle for continuous inkjet to selectively spray and deposit liquid-containing binder on a powdered material layer for bonding powder, so that orderly printed two-dimensional powder layers can be piled up to form a three-dimensional structure. 3D printing has been widely applied to the manufacture of minute structures, especially in biomedical tissue engineering fields, due to its low manufacturing cost and flexible manufacturing process in the manufacture of complicated micro three-dimensional microstructures. The 3D printing has distinctly unique advantages in implementing forming of individualized structures.

In the tissue engineering technology, how to repair or replace articular cartilage is a hot point of recent researching. The material used in cartilaginous bionic scaffolds is a function material of a gradient structure, and each of different structural layers has its particular functions according to its characteristics. For example, a porous superficial layer is low in intensity, but it can absorb and release synovial fluid to decrease the wear; an intermediate layer has certain toughness, and can withstand impact and absorb shock; a lower layer is calcified to form a strong physical connection with a bone.

The muscle tendon is a carrier for connecting a muscle with a bone as a cartilage, which can implement the transmission of motion and force. The connecting portion (tendon-to-bone interface) between the muscle tendon and the bone is a complicated gradient structure, which may be divided into four layers (for example, including muscle tendon, non-calcified cartilage, calcified cartilage and bone) gradually from a soft tissue to a hard tissue, and belongs to functionally gradient tissue structures in biology. Such tissue structure plays a crucial role in the connection between the muscle tendon and the bone, which can transmit forces from the muscle tendon to the bone, reduce stress concentration and support biotic links between different kinds of cells. Therefore, many scholars are devoted to the replaceable functionally gradient bionic structure.

At present, there are many bionic designs and manufacture methods for the tendon-to-bone interface. For example, Xiaoran Li et al. has presented a permeation method was in which calcium phosphate may permeate into a nanofiber membrane surface layer and a nanofiber membrane lower layer in a nanofiber structure to form coatings of gradient structure, but this method is quite time consuming in forming process and it only has gradient structures in the surface layer and the lower layer; Cevat Erisken et al. has presented a method to use twin screw extrusion mechanism to make a functionally gradient coating, in which β-tricalcium phosphate (β-TCP) is distributed in polycaprolactone (PCL) by the twin screw extrusion mechanism to form a functionally gradient structure, but such twin screw extrusion mechanism is complex and difficult to operate; and Satyavrata Samavedi et al. has presented a method use electrostatic spinning to make a gradient structure with a simple manufacture technology, in which the gradient structure made has good biocompatibility, but this method can only generate a gradient structure of three layers, which is far from meeting the requirement of multiple layers of functional gradient coatings.

SUMMARY

Based on the above, it is necessary to provide a method for making functionally gradient coatings by 3D printing based on electrostatic spinning and electrostatic spraying, to over the defects of the prior art.

According to an aspect of the present invention, a method for making functionally gradient coatings by 3D printing based on electrostatic spinning and electrostatic spraying is provided. The method uses a hybrid 3D printing system based on electrostatic spinning and electrostatic spraying, and the hybrid 3D printing system including:

a first injection pump, a second injection pump, a first nozzle, a second nozzle, a high voltage power supply, a core rod collector, a controller, a motor and a speed-adjusting unit; the first injection pump, the first nozzle, the high voltage power supply, the core rod collector and the controller constitute an electrostatic spinning subsystem which uses the high voltage power supply to apply a first high-voltage electrostatic field so that first material sprayed from the first nozzle forms filaments under the applied first high-voltage electrostatic field, and the core rod collector is adapted to collect the filaments to form a first material coating; the second injection pump, the second nozzle, the high voltage power supply, the core rod collector and the controller constitute an electrostatic spraying subsystem which uses the high voltage power supply to apply a second high-voltage electrostatic field so that second material prayed from the second nozzle move in a definite direction under the applied second high-voltage electrostatic field, and the core rod collector is adapted to collect the second material to form a second material coating.

The method includes the following steps:
step A, controlling the electrostatic spinning subsystem, by the controller, to generate the first material coating; and
step B, controlling the electrostatic spraying subsystem, by the controller, to generate the second material coating.

In one embodiment, the method further includes repeating the step A two or more times and/or repeating the step B two or more times.

In one embodiment, the step A and the step B are conducted simultaneously or successively.

In one embodiment, the step A includes:
preparing the first material;
putting the prepared first material into the first injection pump;
inputting, into the controller, initial values of a first set of control parameters used in electrostatic spinning process, wherein the first set of control parameters includes one or more selected from the group consisting of feed rate of the first material, time for spinning, voltage of the first nozzle, distance between the first nozzle and the core rod collector, and rotational speed of the core rod collector;

adjusting, by the controller, the first set of control parameters according to the initial values of the first set of control parameters; and conducting spinning between the first nozzle and the core rod collector to generate the first material coating on the core rod collector.

In one embodiment, the step B includes:

preparing the second material;

putting the prepared second material into the second injection pump;

inputting, into the controller, initial values of a second set of control parameters used in electrostatic spraying process, wherein the second set of control parameters includes one or more selected from the group consisting of feed rate of the second material, time for spinning, voltage of the second nozzle, distance between the second nozzle and the core rod collector, and rotational speed of the core rod collector;

adjusting, by the controller, the second set of control parameters according to the initial values of the second set of control parameters; and conducting spraying on the core rod collector to generate the second material coating.

In one embodiment, the method further includes changing, by the controller, values of the first set of control parameters and/or values of the second set of control parameters dynamically and in real time when the electrostatic spinning subsystem and/or the electrostatic spraying subsystem is working, during manufacturing process of the functionally gradient coatings.

In one embodiment, the first material is polymer, and the electrostatic spinning subsystem is adapted to form a polymer coating from the first material.

In one embodiment, the second material is inorganic salt, and the electrostatic spraying subsystem is adapted to form an inorganic coating from the second material.

In one embodiment, the electrostatic spinning subsystem and the electrostatic spraying subsystem are configured to work separately, alternatively or simultaneously.

In one embodiment, the method further includes:

configuring the electrostatic spinning subsystem and the electrostatic spraying subsystem to work simultaneously, and combining the generated first material coating and the generated second material coating into a mixed material coating;

changing, by the controller, values of the first set of control parameters and values of the second set of control parameters dynamically and in real time when the electrostatic spraying subsystem and the electrostatic spinning subsystem are working, to form a plurality of mixed material coatings; and stacking and combining the plurality of mixed material coatings to form functionally gradient coatings.

The above method for making functionally gradient coatings by 3D printing based on electrostatic spinning and electrostatic spraying can both implement spraying printing for inorganic salt, such as hydroxylapatite (HA), and implement electrostatic spinning for polymer, such as polycaprolactone (PCL), to achieve the manufacture of the preparing functionally gradient coatings. The present invention is simple in structure and easy to operate, simplifies technological process of making the functionally gradient coatings, and can make multiple layers of functional gradient coatings according to individual needs.

BRIEF DESCRIPTION OF THE DRAWINGS

The accompanying drawings illustrate one or more embodiments of the present invention and together with the written description, serve to explain the principles of the present invention. Wherever possible, the same reference numbers are used throughout the drawings to refer to the same or like elements of an embodiment.

DETAILED DESCRIPTION OF THE PREFERRED EMBODIMENTS

In the following description of embodiments, reference is made to the accompanying drawings which form a part hereof, and in which it is shown by way of illustration specific embodiments of the present invention that can be practiced. It is to be understood that other embodiments can be used and structural changes can be made without departing from the scope of the disclosed embodiments.

Figure 1:
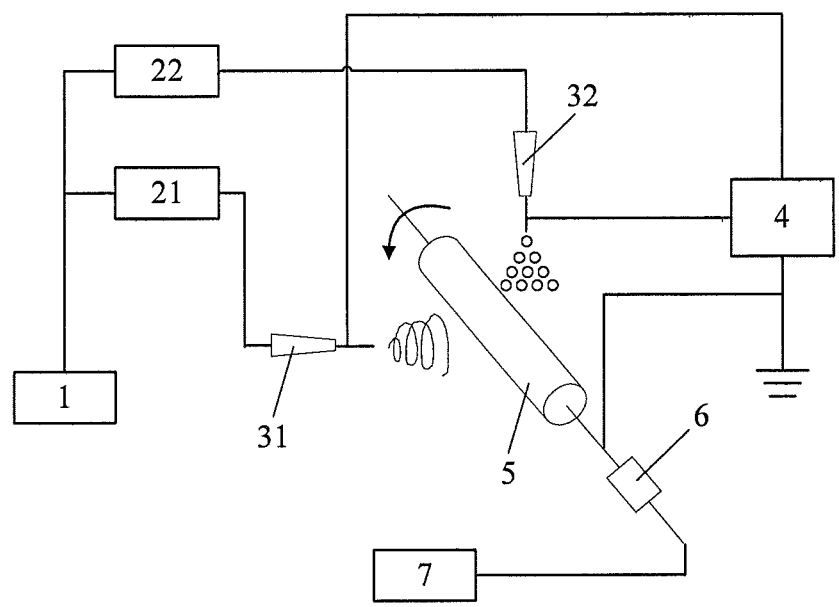
FIG. 1 is a schematic diagram illustrating a hybrid 3D printing system based on electrostatic spinning and electrostatic spraying in accordance with one embodiment of the present invention.

FIG. 1 is a schematic diagram illustrating a hybrid 3D printing system based on electrostatic spinning and electrostatic spraying in accordance with one embodiment of the present invention. The hybrid 3D printing system may include: a first injection pump 21, a second injection pump 22, a first nozzle 31, a second nozzle 32, a high voltage power supply 4, a core rod collector 5, a controller 1, a motor 6 and a speed-adjusting unit 7. The first injection pump 21, the first nozzle 31, the high voltage power supply 4, the core rod collector 5 and the controller 1 constitute an electrostatic spinning subsystem; and the second injection pump 22, the second nozzle 32, the high voltage power supply 4, the core rod collector 5 and the controller 1 constitute an electrostatic spraying subsystem The process to make a material coating by the electrostatic spinning subsystem is described as below.

Preparing the first material, i.e., polymer solution, such as polycaprolactone or acetic acid solution;

putting the prepared first material into the first injection pump 21;

inputting, into the controller 1, initial values of a set of control parameters used in electrostatic spinning process;

adjusting, by the controller, feed rate of the first material, time for spinning, voltage of the first nozzle 31, distance between the first nozzle 31 and the core rod collector 5, and rotational speed of the core rod collector 5 according to the initial values of the set of control parameters; and conducting spinning between the first nozzle 31 and the core rod collector 5 to generate the first material coating on the core rod collector 5.

Figure 2:
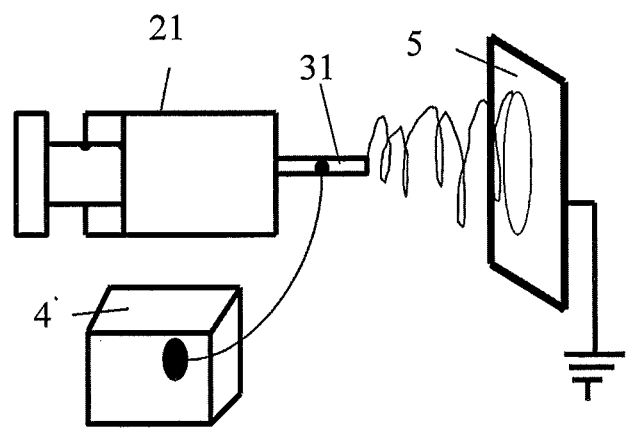
FIG. 2 is a schematic diagram illustrating a process of electrostatic spinning.

FIG. 2 shows the operating principle of electrostatic spinning.

The electrostatic spinning subsystem may use the high voltage power supply 4 to apply a first high-voltage electrostatic field; the high voltage power supply 4 may charge the droplets of the polymer solution, the droplets on the surface of the polymer solution may overcome surface tension to develop and lengthen because of electrostatic repulsion in the first high-voltage electrostatic field, and the droplets that overcome surface tension may be sprayed from the first nozzle 31 at a critical force point to form polymer filaments; and the core rod collector 5 may collect the filaments to form a polymer coating. The continuous working of the high voltage power supply 4 may cause a continuous polymer coating formed on the core rod collector 5.

The process to make a material coating by the electrostatic spraying subsystem is described as below.

preparing the second material, i.e., inorganic salt solution, such as hydroxyapatite or ethanol solution;

putting the prepared second material into the second injection pump 22;

inputting, into the controller, initial values of a set of control parameters used in electrostatic spraying process;

adjusting, by the controller, feed rate of the second material, time for spinning, voltage of the second nozzle 32, distance between the second nozzle 32 and the core rod collector 5, and rotational speed of the core rod collector according to the initial values of the set of control parameters; and conducting spraying on the core rod collector 5 to generate the second material coating.

Figure 3:
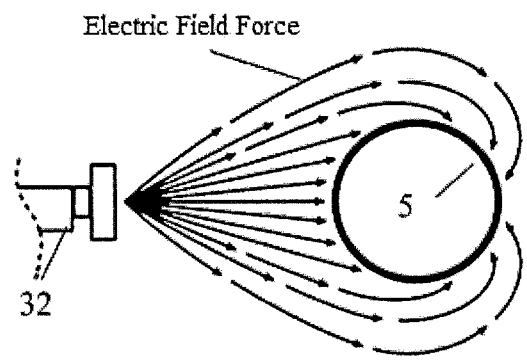
FIG. 3 is a schematic diagram illustrating a process of electrostatic spraying.
Figure 4A:
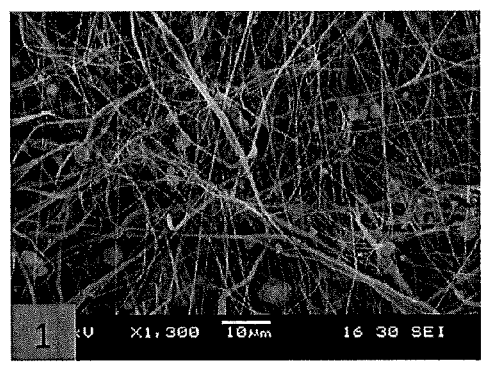
FIGS. 4a-4e are SEM images showing functionally gradient coatings of different physicochemical properties generated by a hybrid 3D printing system based on electrostatic spinning and electrostatic spraying according to different printing parameters in accordance with one embodiment of the present invention.
Figure 4B:
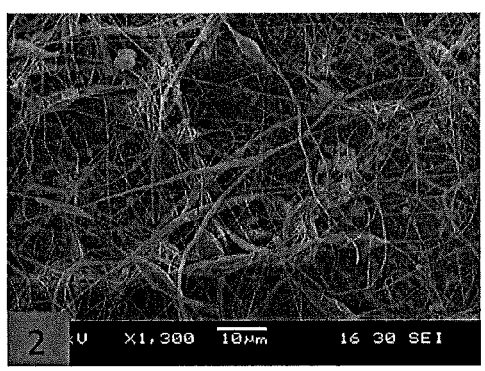
Figure 4C:
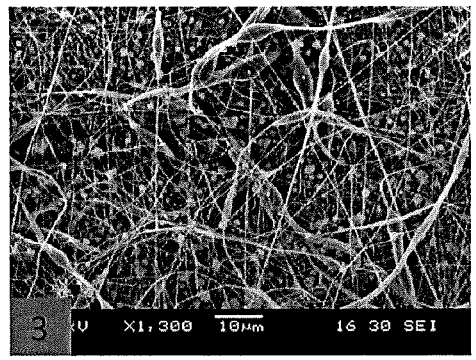
Figure 4D:
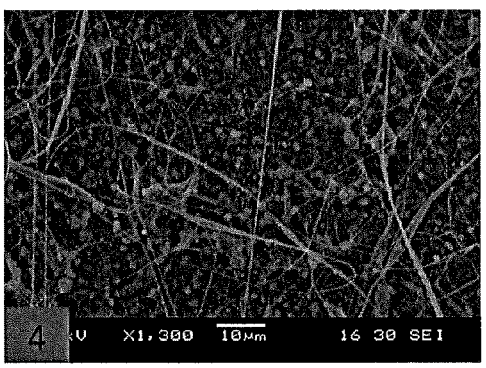
Figure 4E:
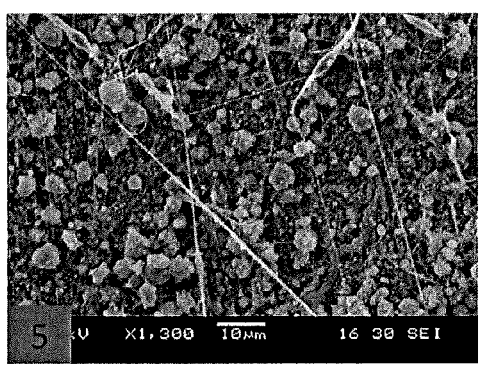

FIG. 3 shows the operating principle of electrostatic spraying.

The electrostatic spraying subsystem may use the high voltage power supply 4 to apply a second high-voltage electrostatic field; the hydroxyapatite solution may overcome surface tension to be sprayed from the second nozzle 32 under the high voltage power supply 4; and the material the surface of which is positively charged may be received by the grounded core rod collector 5 to form a hydroxyapatite coating. The continuous working of the high voltage power supply 4 may cause a continuous hydroxyapatite coating formed on the core rod collector 5.

In the embodiment, the electrostatic spinning subsystem and the electrostatic spraying subsystem are configured to work simultaneously, so that the generated polymer coating and the generated hydroxyapatite coating may be combined to form a mixed material coating. In addition, the electrostatic spinning subsystem and the electrostatic spraying subsystem may be configured to work separately, to form a first material coating and a second material coating respectively.

The hybrid 3D printing system based on electrostatic spinning and electrostatic spraying may dynamically change the two sets of control parameters used in the two subsystems during the printing process based on the actual requirements of design, to produce a mixed material coating of given physicochemical properties which meets the actual needs.

Figure 5:
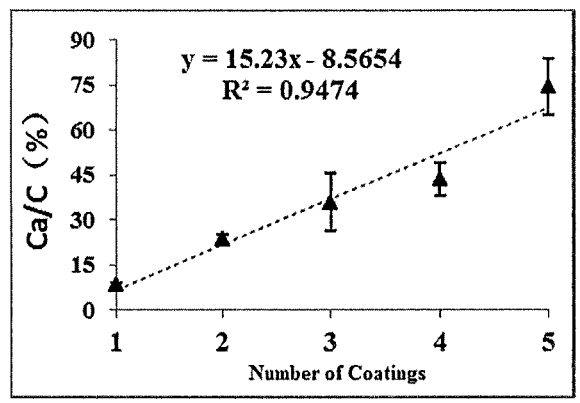
FIG. 5 is an analysis diagram showing the calcium content of the functionally gradient coatings shown in FIGS. 4a-4e respectively.
Figure 6:
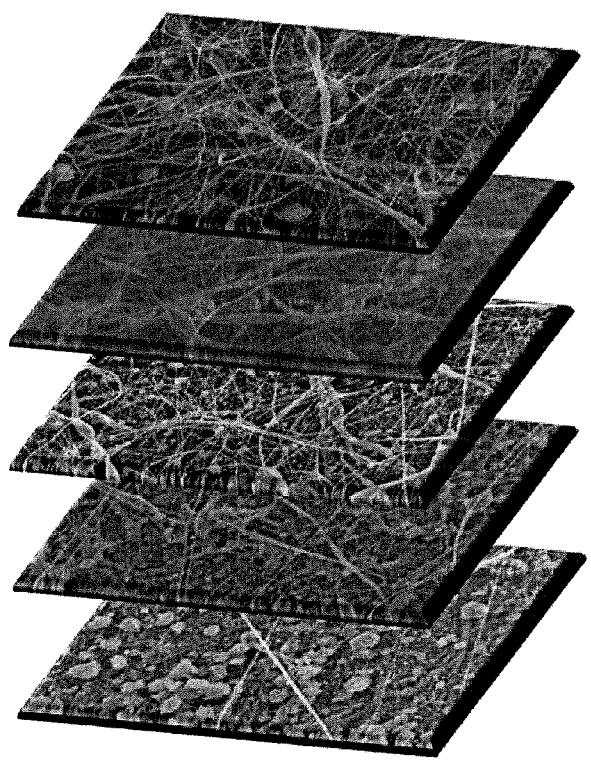
FIG. 6 is a schematic diagram showing layers of a functionally gradient structure formed by the functionally gradient coatings shown in FIGS. 4a-4e.

FIGS. 4a-4e are SEM images showing functionally gradient coatings of different physicochemical properties generated by a hybrid 3D printing system based on electrostatic spinning and electrostatic spraying according to different printing parameters (a first set of control parameters used in the electrostatic spinning subsystem and a second set of control parameters used in the electrostatic spraying subsystem) in accordance with one embodiment of the present invention. FIGS. 4a-4e with number from 1 to 5 show five coatings arranged from 1 to 5. FIG. 5 is an analysis diagram showing the calcium content of the functionally gradient coatings shown in FIGS. 4a-4e respectively. It shows that the first coating has the lowest calcium content, and the calcium content of the second, third, fourth and fifth coating increases gradually. Changes in the calcium content of the five functionally gradient coatings may meet the requirement of functional gradient. The different functionally gradient coatings may be generated by changing printing parameters dynamically and in real time, and these functionally gradient coatings can be stacked and combined to form a functionally gradient bionic structure with gradiently distributed calcium content, as shown in FIG. 6.

The above preferred embodiments of the present invention are described in detail, and should not be deemed as limitations to the scope of the present invention. It should be noted that variations and improvements will become apparent to those skilled in the art to which the present invention pertains without departing from its spirit and scope. Therefore, the scope of the present disclosure is defined by the appended claims

The invention claimed is:

1. A method for making a tendon-to-bone interface by 3D printing based on electrostatic spinning and electrostatic spraying, using a hybrid 3D printing system based on electrostatic spinning and electrostatic spraying, the hybrid 3D printing system including:

a first injection pump, a second injection pump, a first nozzle, a second nozzle, a high voltage power supply, a core rod collector, a controller, and a motor, wherein the first injection pump, the first nozzle, the high voltage power supply, the core rod collector, and the controller constitute an electrostatic spinning subsystem that uses the high voltage power supply to apply a first high-voltage electrostatic field so that a first material sprayed from the first nozzle forms filaments under the applied first high-voltage electrostatic field, and the core rod collector is adapted to collect the filaments to form a first material coating; and the second injection pump, the second nozzle, the high voltage power supply, the core rod collector, and the controller constitute an electrostatic spraying subsystem that uses the high voltage power supply to apply a second high-voltage electrostatic field so that a second material is sprayed from the second nozzle that moves in a definite direction under the applied second high-voltage electrostatic field, and the core rod collector is adapted to collect the second material to form a second material coating;

the method comprising:

step A) controlling the electrostatic spinning subsystem, by the controller, to generate the first material coating;

step B) controlling the electrostatic spraying subsystem, by the controller, to generate the second material coating that has a calcium content, in which the second material coating is formed from the second material sprayed from the second nozzle with the second nozzle moving in a definite direction under the second high-voltage electrostatic field used by the electrostatic spraying subsystem;

step C) combining the first material coating and the second material coating to form a mixed material coating, which has a calcium content from the second material coating;

step D) repeating steps A) to C) to form a plurality of mixed material coatings by operating the electrostatic spinning subsystem and the electrostatic spraying subsystem, respectively, by changing values of a first set of control parameters and a second set of control parameters dynamically and in real time to gradually increase the calcium content of each mixed material coating from that of the firstly formed mixed material coating to that of the lastly formed mixed material coating; and finally, step E) stacking and combining the plurality of mixed material coatings to form multiple layers of a tendon-to-bone interface;

wherein the first material is polycaprolactone; the second material is hydroxyapatite; the first set of control parameters include feed rate of the first material, time for spinning, voltage of the first nozzle, distance between the first nozzle and the core rod collector, and rotational speed of the core rod collector; and the second set of control parameters include feed rate of the second material, time for spinning, voltage of the second nozzle, distance between the second nozzle and the core rod collector, and rotational speed of the core rod collector.

2. The method of claim 1, further comprising repeating step A for two or more times and/or repeating step B for two or more times.

3. The method of claim 1, wherein step A and step B are performed simultaneously or successively.

4. The method of claim 1, wherein step A comprises:
preparing the first material;
putting the prepared first material into the first injection pump;
inputting, into the controller, initial values of the first set of control parameters used in electrostatic spinning process, wherein the first set of control parameters comprise one or more selected from the group consisting of feed rate of the first material, time for spinning, voltage of the first nozzle, distance between the first nozzle and the core rod collector, and rotational speed of the core rod collector;
adjusting, by the controller, the first set of control parameters according to the initial values of the first set of control parameters; and
conducting spinning between the first nozzle and the core rod collector to generate the first material coating on the core rod collector.

5. The method of claim 1, wherein step B comprises:
preparing the second material;
putting the prepared second material into the second injection pump;
inputting, into the controller, initial values of the second set of control parameters used in electrostatic spraying process, wherein the second set of control parameters comprise one or more selected from the group consisting of feed rate of the second material, time for spinning, voltage of the second nozzle, distance between the second nozzle and the core rod collector, and rotational speed of the core rod collector;
adjusting, by the controller, the second set of control parameters according to the initial values of the second set of control parameters; and
conducting spraying on the core rod collector to generate the second material coating.

6. The method of claim 4, further comprising changing, by the controller, values of the first set of control parameters dynamically and in real time when the electrostatic spinning subsystem is working and/or values of the second set of control parameters dynamically and in real time when the electrostatic spraying subsystem is working, during manufacturing process of the tendon-to-bone interface.

7. The method of claim 2, wherein step A and step B are performed simultaneously or successively.

8. The method of claim 5, further comprising changing, by the controller, values of the first set of control parameters dynamically and in real time when the electrostatic spinning subsystem is working and/or values of the second set of control parameters dynamically and in real time when the electrostatic spraying subsystem is working, during manufacturing process of the tendon-to-bone interface.

9. A method for making a tendon-to-bone interface by 3D printing based on electrostatic spinning and electrostatic spraying, using a hybrid 3D printing system based on electrostatic spinning and electrostatic spraying, wherein the electrostatic spinning subsystem and the electrostatic spraying subsystem are configured to work separately, alternatively, or simultaneously, the hybrid 3D printing system including:
a first injection pump, a second injection pump, a first nozzle, a second nozzle, a high voltage power supply, a core rod collector, a controller, and a motor, wherein the first injection pump, the first nozzle, the high voltage power supply, the core rod collector, and the controller constitute an electrostatic spinning subsystem that uses the high voltage power supply to apply a first high-voltage electrostatic field so that a first material sprayed from the first nozzle forms filaments under the applied first high-voltage electrostatic field, and the core rod collector is adapted to collect the filaments to form a first material coating; and the second injection pump, the second nozzle, the high voltage power supply, the core rod collector, and the controller constitute an electrostatic spraying subsystem that uses the high voltage power supply to apply a second high-voltage electrostatic field so that a second material is sprayed from the second nozzle that moves in a definite direction under the applied second high-voltage electrostatic field, and the core rod collector is adapted to collect the second material to form a second material coating;

the method comprising:
controlling the electrostatic spinning subsystem, by the controller, to generate the first material coating;
controlling the electrostatic spraying subsystem, by the controller, to generate the second material coating that has a calcium content, in which the second material coating is formed from the second material sprayed from the second nozzle with the second nozzle moving in a definite direction under the second high-voltage electrostatic field used by the electrostatic spraying subsystem;
combining the first material coating and the second material coating to form a mixed material coating, which has a calcium content from the second material coating;
repeating the controlling and combining steps above to form a plurality of mixed material coatings by operating the electrostatic spinning subsystem and the electrostatic spraying subsystem, respectively, by changing values of a first set of control parameters and a second set of control parameters dynamically and in real time to gradually increase the calcium content of each mixed material coating from that of the firstly formed mixed material coating to that of the lastly formed mixed material coating; and finally stacking and combining the plurality of mixed material coatings to form multiple layers of a tendon-to-bone interface;

wherein the first material is polycaprolactone; the second material is hydroxyapatite; the first set of control parameters include feed rate of the first material, time for spinning, voltage of the first nozzle, distance between the first nozzle and the core rod collector, and rotational speed of the core rod collector; and the second set of control parameters include feed rate of the second material, time for spinning, voltage of the second nozzle, distance between the second nozzle and the core rod collector, and rotational speed of the core rod collector.

10. The method of claim 9, further comprising configuring the electrostatic spinning subsystem and the electrostatic spraying subsystem to work simultaneously.

11. The method of claim 10, wherein step D is performed by changing values of a first set of control parameters and values of a second set of control parameters dynamically and in real time when the electrostatic spinning subsystem and the electrostatic spraying subsystem are working.

* * * * *